(12) United States Patent
Bloodworth et al.

(10) Patent No.: US 7,451,995 B2
(45) Date of Patent: Nov. 18, 2008

(54) KING PIN ASSEMBLY FOR SECURING TRAILER TO FIFTH WHEEL

(75) Inventors: Jeffrey L. Bloodworth, Cary, NC (US); Dennis Skaradzinski, Cary, NC (US); Walter William Wuerfel, III, Clayton, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 256 days.

(21) Appl. No.: 11/236,343

(22) Filed: Sep. 27, 2005

(65) Prior Publication Data

US 2007/0069500 A1    Mar. 29, 2007

(51) Int. Cl.
*B62D 53/66* (2006.01)

(52) U.S. Cl. .................... 280/433; 384/421

(58) Field of Classification Search ........... 280/433; 384/421
See application file for complete search history.

(56) References Cited

U.S. PATENT DOCUMENTS

| 3,337,277 | A | * | 8/1967 | Arnold ..................... 384/421 |
| 4,394,030 | A | | 7/1983 | Inque |
| 4,457,531 | A | * | 7/1984 | Hunger ..................... 280/433 |
| 5,794,402 | A | | 8/1998 | Dumlao et al. |
| 6,023,806 | A | | 2/2000 | Dumlao et al. |
| 6,044,607 | A | | 4/2000 | Dumlao et al. |
| 6,070,378 | A | | 6/2000 | Dumlao et al. |
| 6,073,952 | A | | 6/2000 | Schulz |
| 6,081,955 | A | | 7/2000 | Dumlao et al. |
| 6,108,998 | A | | 8/2000 | Dumlao |
| 6,158,773 | A | * | 12/2000 | Verhaeghe ................. 280/787 |
| 6,467,118 | B2 | | 10/2002 | Dumlao et al. |
| 6,565,109 | B1 | | 5/2003 | Kloepfer |
| 6,645,333 | B2 | | 11/2003 | Johnson et al. |
| 6,676,785 | B2 | | 1/2004 | Johnson et al. |
| 6,773,023 | B2 | * | 8/2004 | Athans et al. ............... 280/433 |
| 7,073,272 | B1 | * | 7/2006 | Lefebvre ..................... 33/600 |

FOREIGN PATENT DOCUMENTS

DE    29821604 U1 *    2/1999

* cited by examiner

*Primary Examiner*—Kevin Hurley
(74) *Attorney, Agent, or Firm*—Barnes & Thornburg LLP

(57) ABSTRACT

A king pin assembly for securing a trailer to a fifth wheel comprises a king pin and a king pin mount. The king pin is adapted to be secured to the fifth wheel. The king pin mount is secured to the king pin and adapted to mount the king pin to the trailer. The king pin mount comprises at least one component comprising a fiber-reinforced composite material.

22 Claims, 10 Drawing Sheets

KING PIN ASSEMBLY FOR SECURING TRAILER TO FIFTH WHEEL

FIELD OF THE DISCLOSURE

The present disclosure relates generally to king pin assemblies for securing trailers to vehicle fifth wheels.

BACKGROUND

King pin assemblies are used to secure a trailer to a fifth wheel of a tractor or other vehicle. A king pin assembly has a king pin which is received by the fifth wheel to connect the trailer and the vehicle

SUMMARY

According to one aspect of the present disclosure, a king pin assembly for coupling a trailer to a fifth wheel comprises a king pin adapted to be secured to the fifth wheel. The king pin mount is secured to the king pin and adapted to mount the king pin to the trailer. The king pin mount comprises at least one component comprising a fiber-reinforced composite material. Use of such a fiber-reinforced composite component prolongs the useful life of the king pin mount.

The king pin assembly may be used with a variety of trailers. For example, it may be used with platform trailers and box trailers.

BRIEF DESCRIPTION OF THE DRAWINGS

The detailed description particularly refers to the accompanying figures in which.

DETAILED DESCRIPTION OF THE DRAWINGS

Figure 1:
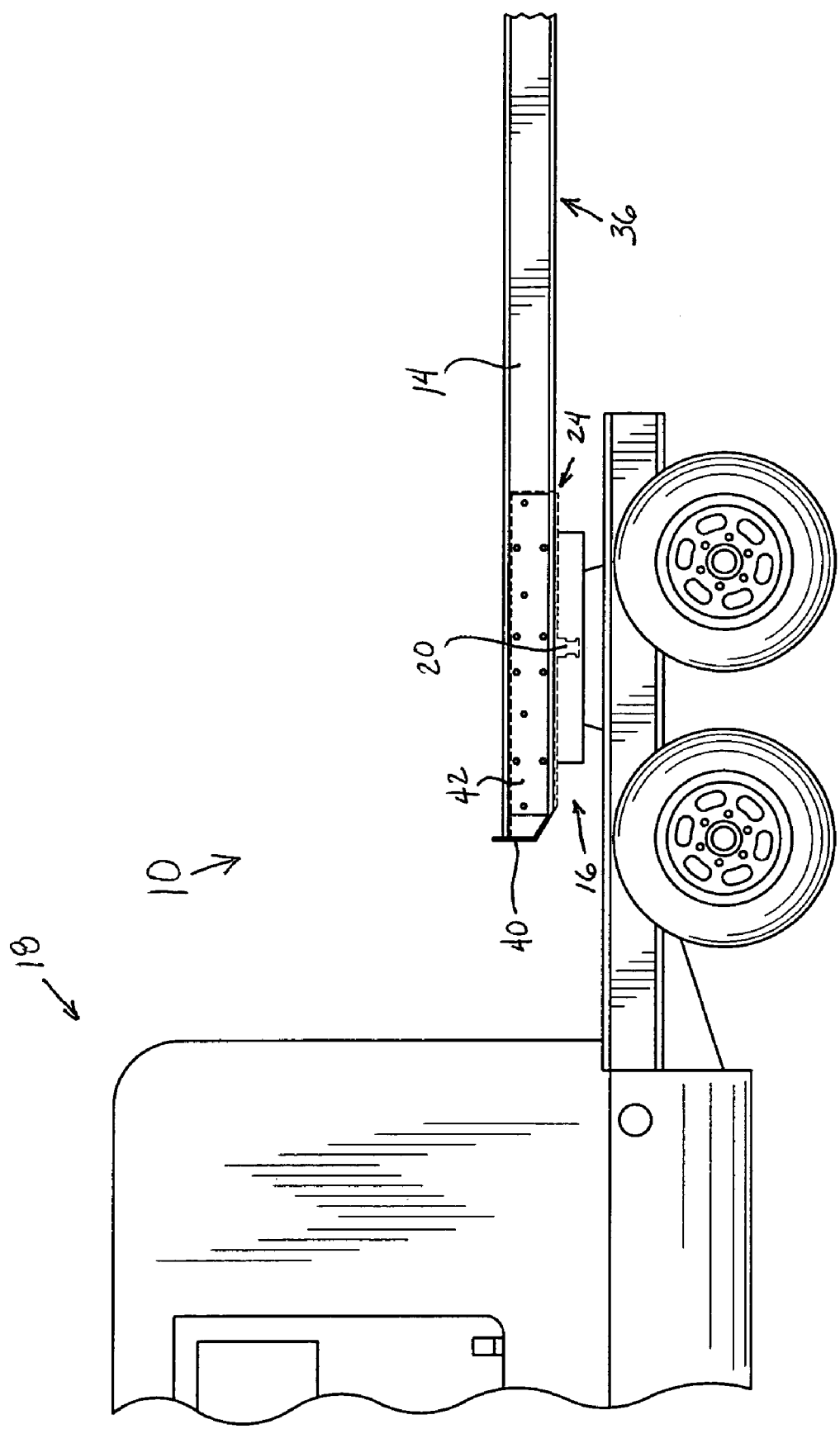
FIG. 1 is a side elevation view showing a first king pin assembly securing a platform trailer to a fifth wheel of a vehicle.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring to FIG. 1, there is shown a king pin assembly 10 for securing a trailer 14 to a fifth wheel 16 of a prime mover 18 such as a tractor or other vehicle. The king pin assembly 10 includes a king pin 20 adapted to be secured to the fifth wheel 16 and a king pin mount 22 (see FIG. 2) secured to the king pin 20 and adapted to mount the king pin 20 to the trailer 14. Illustratively, the king pin mount 22 comprises a relatively high strength-to-weight ratio fiber-reinforced composite material. Use of such a fiber-reinforced composite material enhances the durability and thus the useful life of the mount 22.

Figure 2:
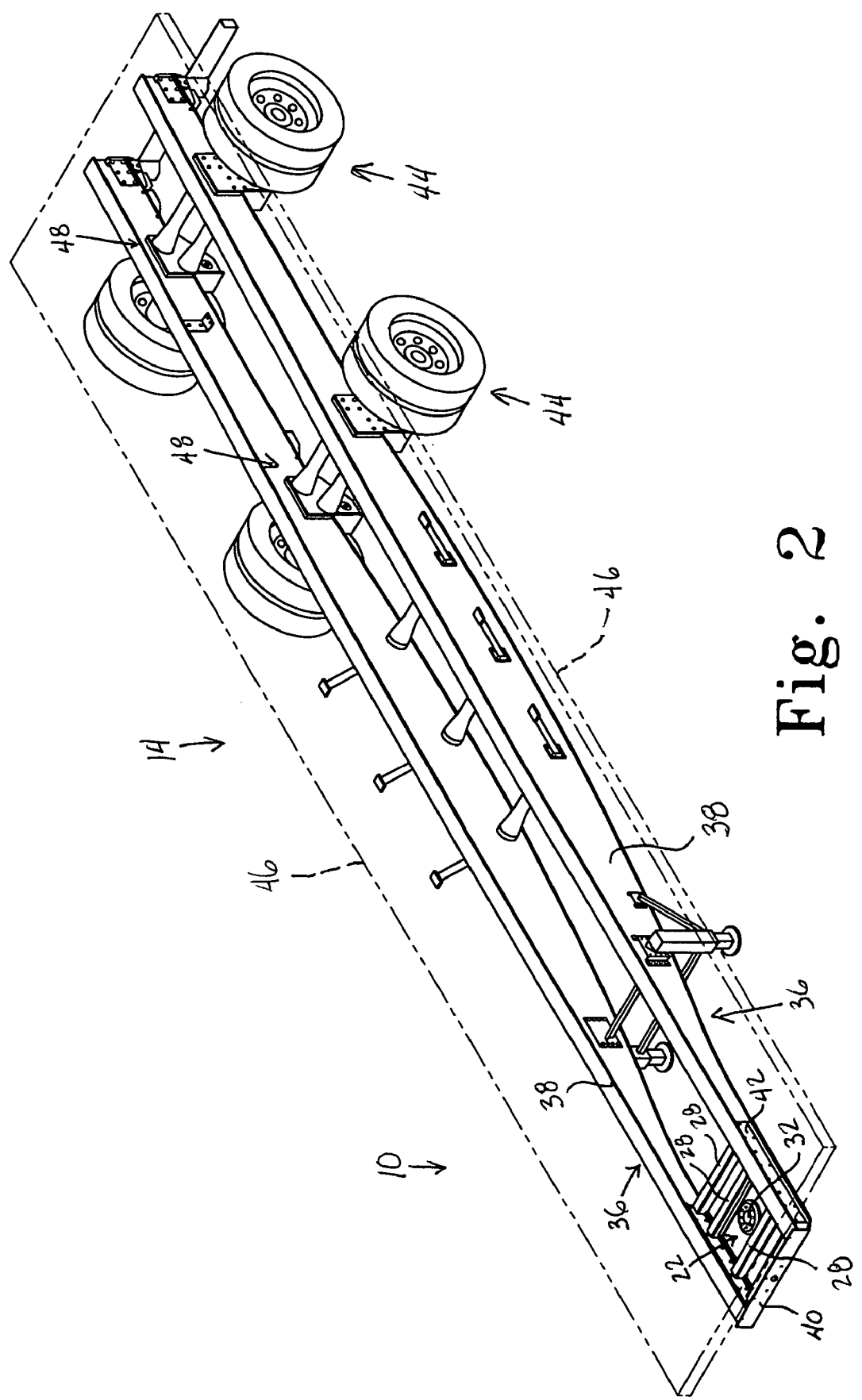
FIG. 2 is a perspective view showing the first king pin assembly near the front of the platform trailer (note that the floor decking of the trailer has been removed for clarity of description)

Referring to FIG. 2, the trailer 14 is, for example, a platform trailer comprising a chassis 36 including a pair of parallel main beams 38 extending longitudinally along the length of the trailer 14. The beams 38 are arranged in spaced-apart relation to one another to provide a structure to mount various components of the trailer 14, for example, wheels 44, decking 46, and suspension components 48. The king pin assembly 10 is secured to the chassis 36 between the main beams 38 at a forward portion of the trailer 14 to mount the king pin 20 (see FIG. 1) to the trailer 14.

Figure 3:
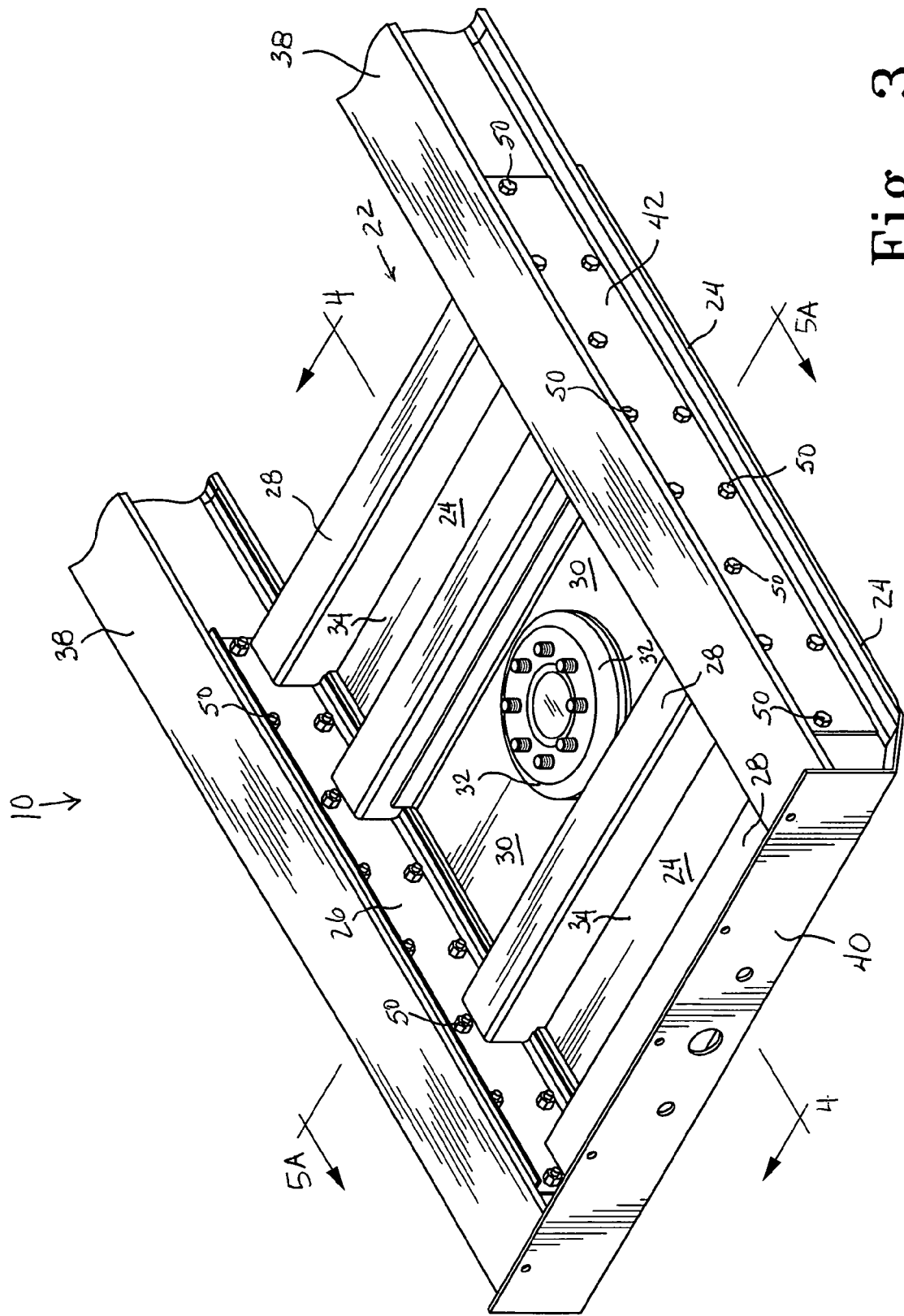
FIG. 3 is an enlarged fragmentary perspective view showing the first king pin assembly.
Figure 4:
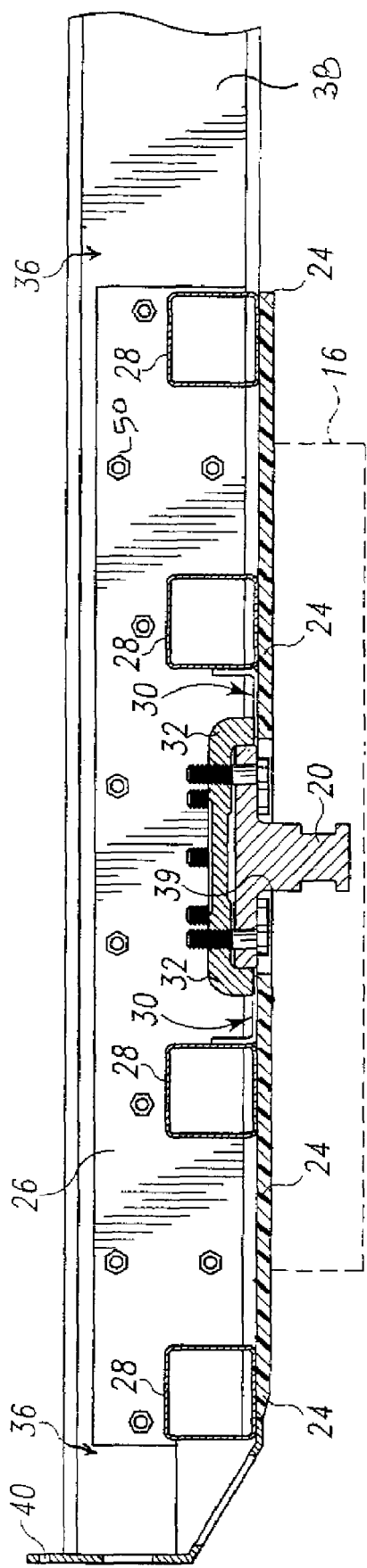
FIG. 4 is a cross sectional view taken along line 4-4 of FIG. 3.

Referring to FIGS. 3 and 4, the king pin mount 22 includes a composite fifth wheel plate 24, a pair of side walls 26, a number of cross members 28, a cup-mounting plate 30 and a cup 32 secured to the cup-mounting plate 30. The composite fifth wheel plate 24 is positioned in face-to-face contact with the vehicle fifth wheel 16 when the king pin 20 is received by the vehicle fifth wheel 16. The king pin 20 is secured to the cup 32 and extends through an aperture 39 defined in the composite fifth wheel plate 24. The cup-mounting plate 30 overlies the composite fifth wheel plate 24. In some embodiments contemplated by this disclosure, cup 32 may be omitted and king pin 20 may be welded to an upper-facing surface of mounting plate 30.

The cross members 28 are secured to an upper surface 34 of the composite fifth wheel plate 24 and extend between the side walls 26. The fifth wheel plate 24 is adapted to contact the fifth wheel 16 when the king pin 20 is secured thereto. Illustratively, the cross members 28 and the cup-mounting plate 30 are bonded to the composite fifth wheel plate 24 by use of an adhesive.

Figure 5A:
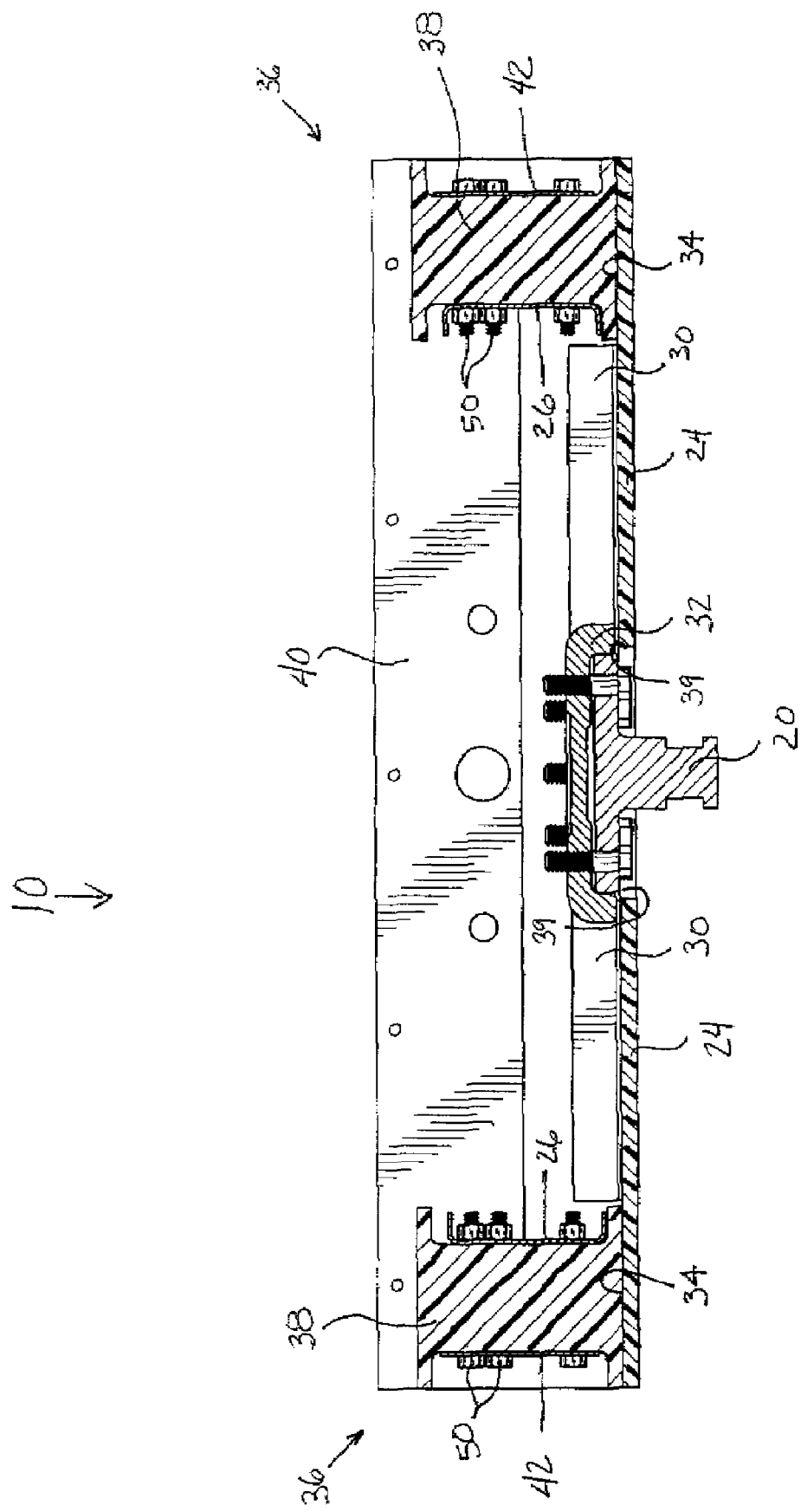
FIG. 5A is a cross sectional view taken along line 5A-5A of FIG. 3, showing the first king pin assembly secured to a first embodiment of the main beams of the platform trailer.

Referring to FIG. 5A, the side walls 26 are illustratively secured to the beams 38 by use of a gusset plate 42 and a number of fasteners 50. Additionally, a bottom-facing surface portion of each beam 38 is bonded to the upper surface 34 of the composite fifth wheel plate 24 by use of an adhesive. In this embodiment, each main beam 38 is a fiber-reinforced solid laminate.

Figure 5B:
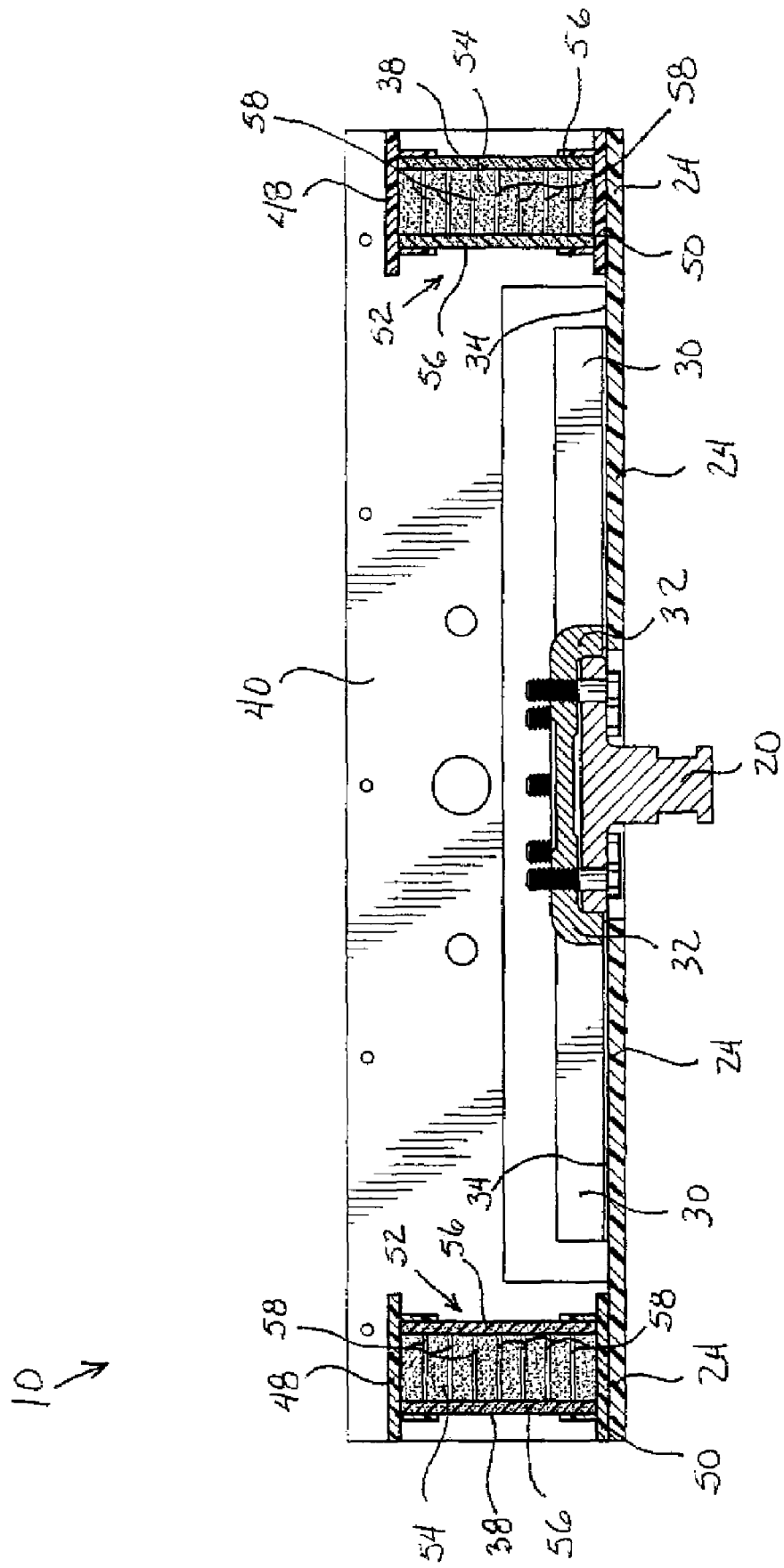
FIG. 5B is a cross sectional view similar to FIG. 5A showing the first king pin assembly secured to a second embodiment of the main beams of the platform trailer.

Referring to FIG. 5B, there is shown the king pin assembly 10 used with an alternative embodiment of the main beams 38. In such a case, each main beam 38 has a fiber-reinforced composite sandwich panel 52 and a pair of fiber-reinforced composite end caps 48, 50 secured thereto. The lower end cap 50 is bonded to the upper surface of the fifth wheel plate 34 by use of an adhesive. The sandwich panel 52 includes a pair of fiber-reinforced composite faces 56, a core 54 sandwiched between the faces 56, and a plurality of fiber insertions 58 extending from the face 56 through the core 54 to the face 56. The panel 52 is made, for example, of TRANSONITE® available from Martin Marietta Materials, Inc. of Raleigh, N.C.

Figure 6:
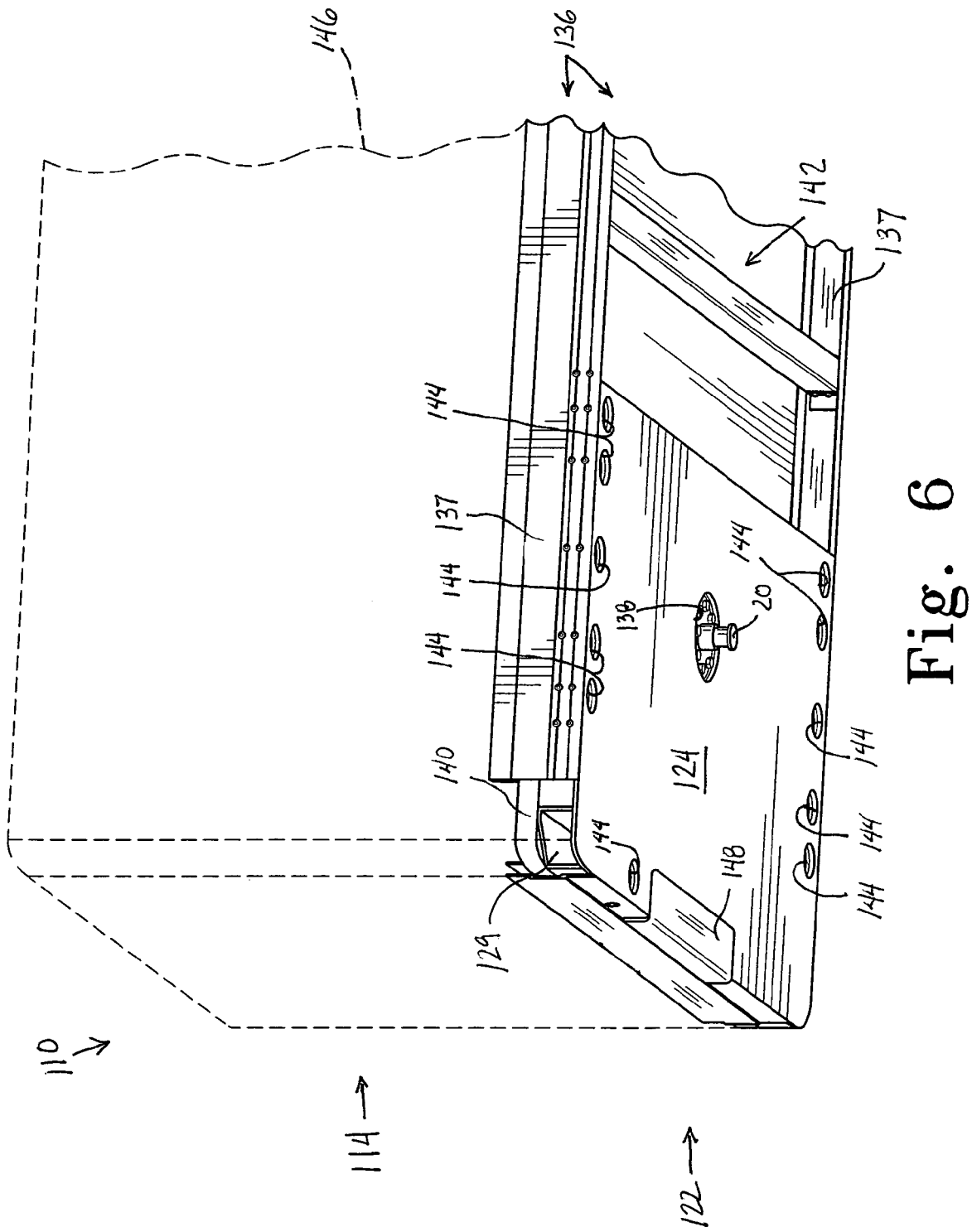
FIG. 6 is a perspective view showing a second king pin assembly for securing a box trailer to a fifth wheel (note that the enclosure of the box trailer is shown in phantom for clarity of description)

Referring to FIG. 6, according to a second exemplary embodiment, there is shown a king pin assembly 110 for securing a box trailer 114 to the fifth wheel 16 (see FIG. 1). The king pin assembly 110 includes the king pin 20 adapted to be secured to the vehicle fifth wheel 16 and a king pin mount 122 secured to the king pin 20 and adapted to mount the king pin 20 to the trailer 114. Illustratively, the king pin mount 122 comprises a relatively high strength-to-weight ratio fiber-reinforced composite material to enhance the durability and thus the useful life of the mount 122.

Figure 7:
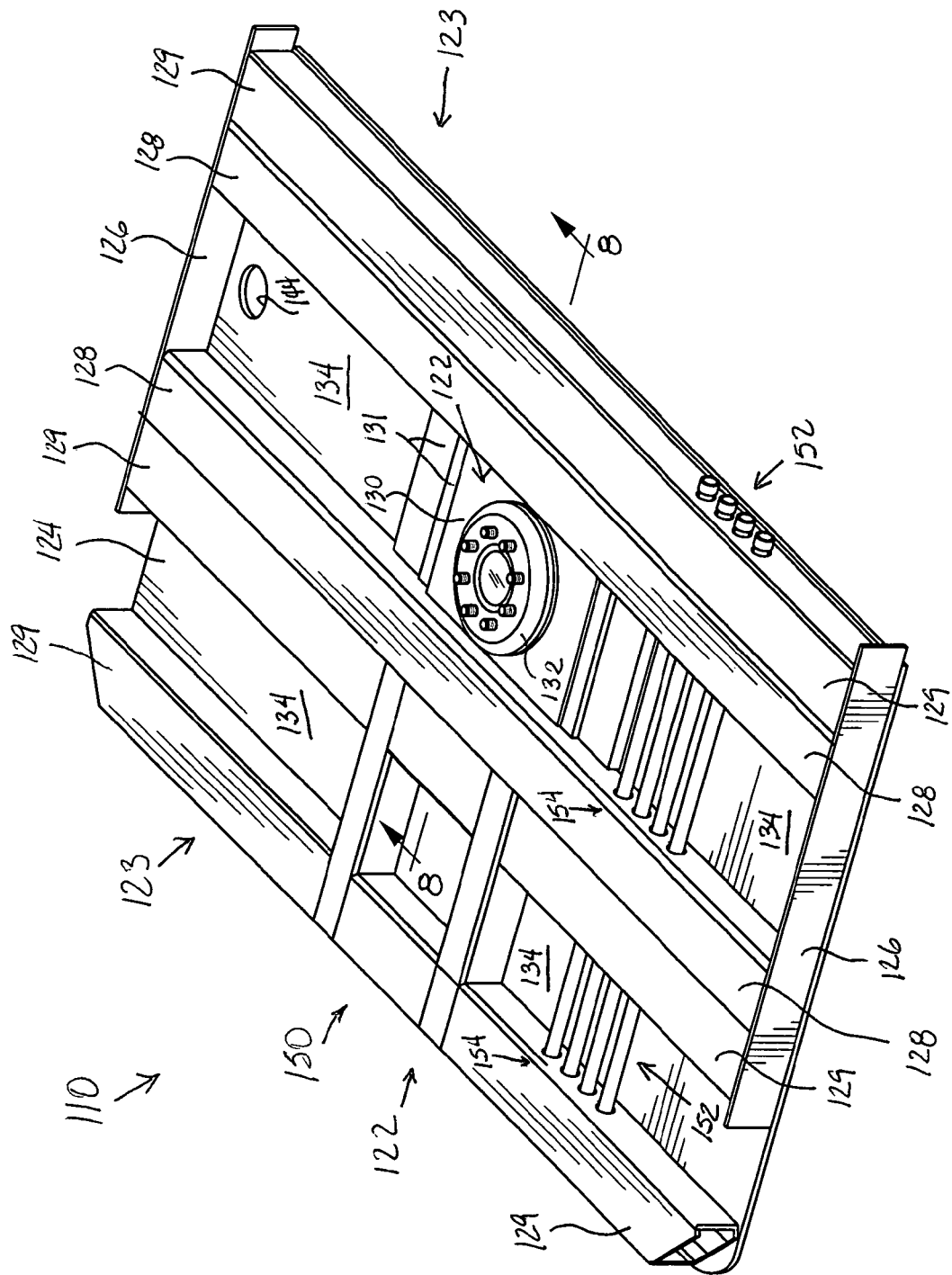
FIG. 7 is an enlarged perspective view of the second king pin assembly.
Figure 8:
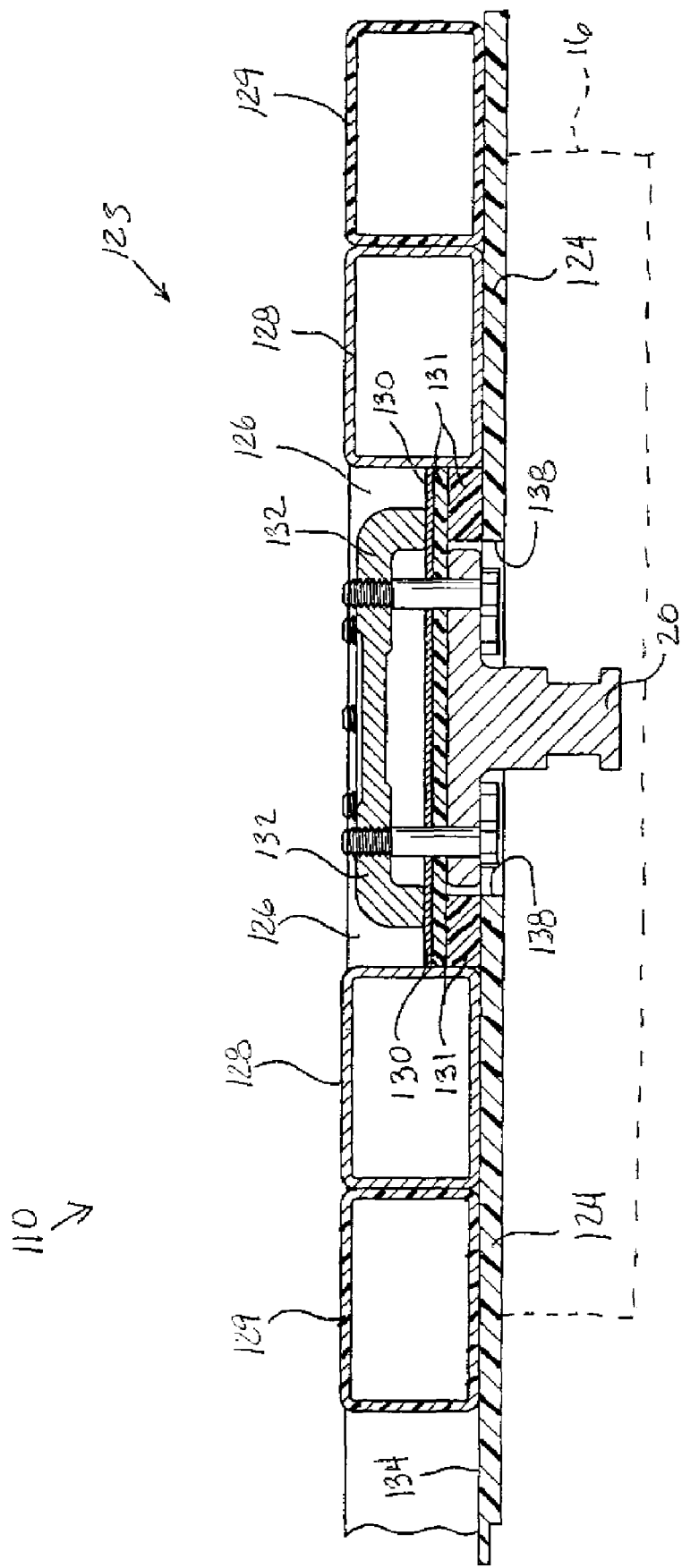
FIG. 8 is a cross sectional view taken along line 8-8 of FIG. 7.

Referring to FIGS. 6, 7, and 8, the king pin mount 122 illustratively includes a fiber-reinforced composite fifth wheel plate 124, a pair of side walls 126, a first set of cross tubes 128, a second set of cross tubes 129, a cup-mounting plate 130, a cup 132 secured to the cup-mounting plate 130, and a composite shim 131. The composite fifth wheel plate 124 is positioned in face-to-face contact with the vehicle fifth wheel 16 when the king pin 20 is received by the vehicle fifth wheel 16. The king pin 20 is secured to the cup 132 and extends through an aperture 138 defined in the composite fifth wheel plate 124. The cup-mounting plate 130 overlies the composite fifth wheel plate 124.

The king pin mount 122 includes a frame 123 including the first set of cross tubes 128, the second set of cross tubes 129 positioned between and secured to the pair of side walls 126, and a U-shaped frame member 150 secured to one of the cross tubes of the first set of cross tubes 128, as shown in FIG. 7. U-shaped frame member 150 is configured to be secured to an approach plate 148.

Illustratively, the first set of cross tubes 128 are made of metal and the second set of cross tubes 129 are made of a composite material. Frame 123 further includes a number of pipes 152 extending longitudinally through apertures 154 defined in the cross tubes of the first and second set of cross tubes 128, 129. Pipes 152 are configured to act as conduits for pressurized air lines and electrical wiring for various trailer systems.

The cross tubes 128, 129 are secured to an upper surface 134 of the composite fifth wheel plate 124 and extend between the side walls 126. The fifth wheel plate 124 is adapted to contact the fifth wheel 16 when the king pin 20 is secured thereto. Illustratively, the cross tubes 128, 129, side walls 126, and composite shim 131 are bonded to the composite fifth wheel plate 124 by use of an adhesive material.

The trailer 114 includes a pair of parallel bottom rails 137 extending longitudinally along the length of the trailer 114. Rails 137 are arranged in spaced-apart relation to receive decking 140, structural cross members 142, and an enclosure portion 146 therebetween. The king pin assembly 110 is secured to a lower surface of the decking 140 of the trailer 114 between bottom rails 137 at a leading end of box trailer 114 to secure box trailer 114 to vehicle fifth wheel 16. Illustratively, mounting plates 126 are secured to rails 137 by use of a number of fasteners.

The king pin mount 122 includes a number of access apertures 144 defined in the mount 122. The apertures 144 provide access for servicing systems of the trailer 114 concealed above the king pin mount 122.

Figure 9:
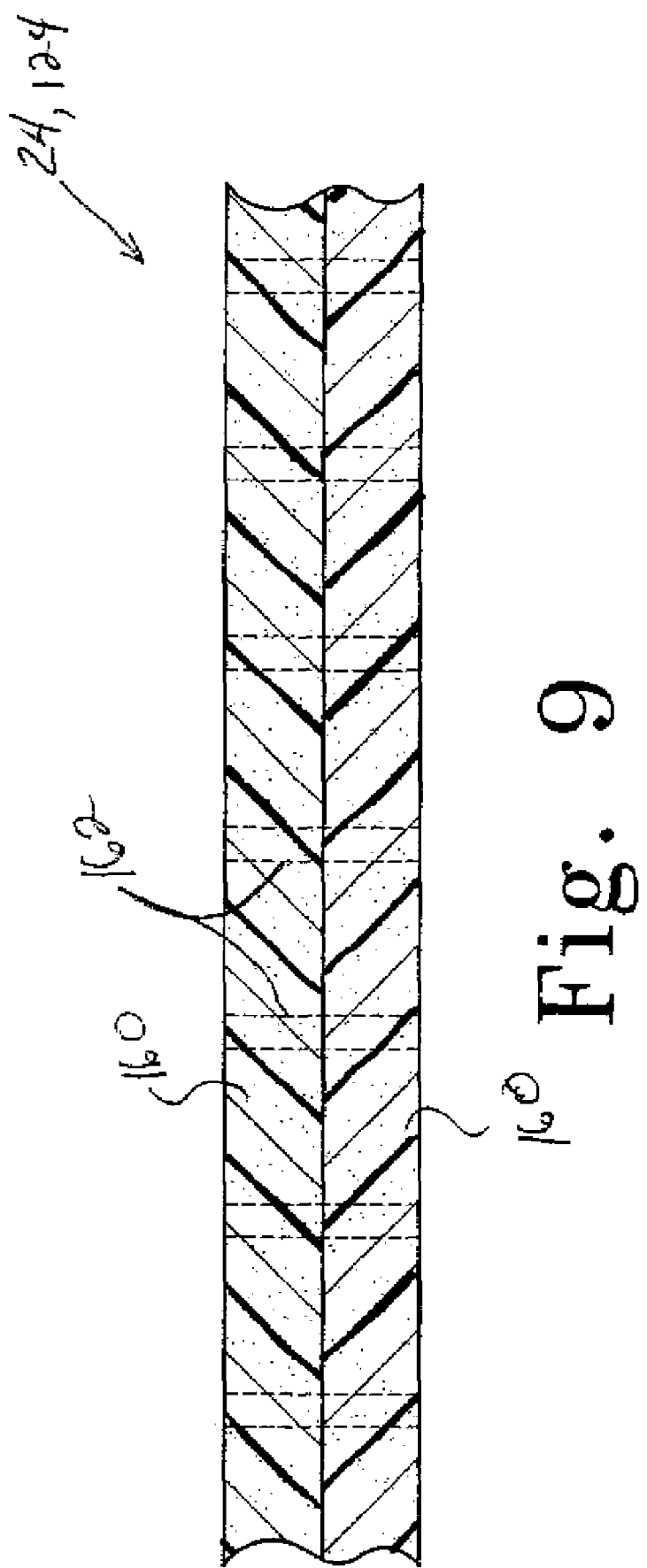
FIG. 9 is an enlarged fragmentary side elevation view of a composite fifth wheel plate.

Referring to FIG. 9, each composite fifth wheel plate 24, 124 is made of a fiber-reinforced polymer that is well-suited to withstand the wear caused by face-to-face contact with the vehicle fifth wheel 16. Illustratively, each plate 24, 124 has first and second fiber-reinforced laminate sheets 160 positioned in face-to-face contact and a plurality of fiber insertions 162 embedded in and connecting the sheets 160. Each plate 24, 124 has a thickness of, for example, about 12.7 mm.

Each king pin assembly 10, 110 weighs less than or equal to 850 pounds. For example, each king pin assembly 10, 110 weighs between about 700 pounds and about 850 pounds. In one example, each assembly 10, 110 may weigh about 700 pounds and in another example, each assembly 10, 110 may weigh about 850 pounds.

It is within the scope of this disclosure for each of the composite components disclosed herein to be constructed as any suitable fiber-reinforced composite structure. An example of such a structure is a fiber-reinforced polymer (FRP) composite structure. Such an FRP structure may include a polymer matrix having a reinforcing element and a polymer resin. The FRP structure may be embodied as any type of FRP structure. Examples of such structures include, but are not limited to, a solid laminate, a pultruded or vacuum-infused sandwich panel (e.g., a panel having a pair of skins with a core therebetween), pultruded panel (e.g., a panel having a pair of layers with vertical or diagonal webs therebetween), or TRANSONITE® available from Martin Marietta Materials, Inc. of Raleigh, N.C. In the case where the FRP structure is embodied as a sandwich panel, the core type may include, but is not limited to, wood, foam and various types of honeycomb.

The matrix includes, for example, a thermosetting resin, although thermoplastic resins are also contemplated for use. Examples of thermosetting resins which may be used include, but are not limited to, unsaturated polyesters, vinyl esters, polyurethanes, epoxies, phenolics, and mixtures and blends thereof.

The reinforcing element may include E-glass fibers, although other reinforcements such as S-glass, carbon, KEVLAR®, metal, high modulus organic fibers (e.g. aromatic polyamides, polybenzamidazoles, and aromatic polyimides), and other organic fibers (e.g. polyethylene and nylon) may be used. Blends and hybrids of such materials may be used for the reinforcing element. Other suitable composite materials may be used for the reinforcing element including whiskers and fibers such as boron, aluminum silicate, basalt, carbon nano-fibers, and other nano-fibers.

The FRP structure may be embodied as any of the structures disclosed in U.S. Pat. Nos. 5,794,402; 6,023,806; 6,044,607; 6,070,378; 6,081,955; 6,108,998; 6,467,118 B2; 6,645,333; 6,676,785, the entirety of each of which is hereby incorporated by reference. It should be appreciated that the structures disclosed in the above-identified patents may be sized, scaled, dimensioned, orientated, or otherwise configured in any desired manner to fit the needs of a given design of the FRP structure.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the invention as defined by the appended claims.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. A king pin assembly for securing a trailer to a fifth wheel, the king pin assembly comprising:
a king pin adapted to be secured to the fifth wheel, and
a king pin mount secured to the king pin and adapted to mount the king pin to the trailer, the king pin mount including a composite fifth wheel plate having a first laminate sheet, a second laminate sheet secured on the first laminate sheet, and at least one fiber insertion extending in both the first laminate sheet and the second laminate sheet.

2. The king pin assembly of claim 1, wherein:
the composite fifth wheel plate is adapted to contact the fifth wheel when the king pin is secured thereto.

3. The king pin assembly of claim 2, wherein:
the king pin is mounted to the trailer by the king pin mount and is received by the fifth wheel, and
the composite fifth wheel plate is positioned in face-to-face contact with the fifth wheel.

4. The king pin assembly of claim 2, wherein the composite fifth wheel plate defines an aperture receiving the king pin.

5. The king pin assembly of claim 2, wherein the king pin mount comprises a number of cross members secured to an upper surface of the composite fifth wheel plate.

6. The king pin assembly of claim 2 wherein:
the king pin mount comprises a cup-mounting plate and a cup secured to the cup-mounting plate,
the king pin is secured to the cup and extends through an aperture defined in the composite fifth wheel plate, and
the cup-mounting plate overlies the composite fifth wheel plate.

7. The king pin assembly of claim 1, wherein the at least one component is made of a fiber-reinforced polymer.

8. The king pin assembly of claim 1, wherein the weight of the king ping assembly is between about 700 pounds and about 850 pounds.

9. The king pin assembly of claim 1, wherein the weight of the king pin assembly is about 700 pounds.

10. The king pin assembly of claim 1, wherein the weight of the king pin assembly is less than or equal to 850 pounds.

11. An apparatus, comprising:
a platform trailer,
a king pin adapted to be secured to a fifth wheel, and
a king pin mount secured to the king pin and the platform trailer so as to mount the king pin to the platform trailer, the king pin mount including a composite fifth wheel plate having a first laminate sheet, a second laminate sheet secured on the first laminate sheet, and at least one fiber insertion extending in both the first laminate sheet and the second laminate sheet.

12. The apparatus of claim 11, wherein the king pin mount comprises a composite fifth wheel plate made of a fiber-reinforced composite material and adapted to contact the fifth wheel when the king pin is secured to the fifth wheel.

13. The apparatus of claim 12, wherein:
the platform trailer comprises a chassis comprising a pair of main beams extending longitudinally along the platform trailer, and
the composite fifth wheel plate is secured to the main beams.

14. The apparatus of claims 13, wherein:
the king pin mount comprises cross tubes positioned between the main beams, and
an upper surface of the composite fifth wheel plate is secured to the cross tubes and the main beams.

15. The apparatus of claim 13, wherein at least one of the main beams is made of a fiber-reinforced composite material and comprises a lower surface secured to an upper surface of the composite fifth wheel plate.

16. The apparatus of claim 12, wherein:
the king pin mount comprises a cup-mounting plate and a cup secured to the cup-mounting plate,
the king pin is secured to the cup and extends through an aperture defined in the composite fifth wheel plate, and
the cup-mounting plate is secured to the composite fifth wheel plate.

17. The apparatus of claim 11, wherein:
the platform trailer comprises a chassis, and
the composite component is secured to the chassis.

18. A king pin assembly for securing a trailer to a fifth wheel, the king pin assembly comprising:
a king pin adapted to be secured to the fifth wheel, and
a king pin mount secured to the king pin and adapted to mount the king pin to the trailer, the king pin mount comprising a composite fifth wheel plate made of the fiber-reinforced composite material including a first laminate sheet, a second laminate sheet secured on the first laminate sheet, and at least one fiber insertion extending in both the first laminate sheet and the second laminate sheet, and the composite fifth wheel plate is adapted to contact the fifth wheel when the king pin is secured thereto.

19. A king pin assembly for securing a trailer to a fifth wheel, the king pin assembly comprising:
a king pin adapted to be secured to the fifth wheel, and
a king pin mount secured to the king pin and adapted to mount the king pin to the trailer, the king pin mount comprising a composite fifth wheel plate made of the fiber-reinforced composite material, and the composite fifth wheel plate is adapted to contact the fifth wheel when the king pin is secured thereto,
wherein the king pin mount comprises a number of cross members secured to an upper surface of the composite fifth wheel plate.

20. A king pin assembly for securing a trailer to a fifth wheel, the king pin assembly comprising:
a king pin adapted to be secured to the fifth wheel, and
a king pin mount secured to the king pin and adapted to mount the king pin to the trailer, the king pin mount comprising a composite fifth wheel plate made of the fiber-reinforced composite material, and the composite fifth wheel plate is adapted to contact the fifth wheel when the king pin is secured thereto,
wherein the king pin mount comprises a cup-mounting plate and a cup secured to the cup-mounting plate, the king pin is secured to the cup and extends through an aperture defined in the composite fifth wheel plate, and the cup-mounting plate overlies the composite fifth wheel plate.

21. An apparatus, comprising:
a platform trailer comprising a chassis comprising a pair of main beams extending longitudinally along the platform trailer,
a king pin adapted to be secured to a fifth wheel, and
a king pin mount secured to the king pin and the platform trailer so as to mount the king pin to the platform trailer, the king pin mount comprising (i) a composite fifth wheel plate made of a fiber-reinforced composite material and adapted to contact the fifth wheel when the king pin is secured to the fifth wheel, the composite fifth wheel plate secured to the main beams of the chassis, (ii) cross tubes positioned between the main beams, wherein an upper surface of the composite fifth wheel plate is secured to the cross tubes and the main beams.

22. An apparatus, comprising:

a platform trailer, a king pin adapted to be secured to a fifth wheel, and a king pin mount secured to the king pin and the platform trailer so as to mount the king pin to the platform trailer, the king pin mount comprising (i) a composite fifth wheel plate made of a fiber-reinforced composite material and adapted to contact the fifth wheel when the king pin is secured to the fifth wheel, (ii) a cup-mounting plate and a cup secured to the cup-mounting plate, wherein the king pin is secured to the cup and extends through an aperture defined in the composite fifth wheel plate, and the cup-mounting plate is secured to the composite fifth wheel plate.

* * * * *